United States Patent
Thomas et al.

(10) Patent No.: US 9,982,793 B2
(45) Date of Patent: May 29, 2018

(54) PASSIVE EXHAUST VALVE WITH DUAL TORSION SPRING

(71) Applicant: Tenneco Automotive Operating Company Inc., Lake Forest, IL (US)

(72) Inventors: Stephen M. Thomas, Laingsburg, MI (US); David L. Anderson, Perry, MI (US)

(73) Assignee: Tenneco Automotive Operating Company Inc., Lake Forest, IL (US)

( * ) Notice: Subject to any disclaimer, the term of this patent is extended or adjusted under 35 U.S.C. 154(b) by 43 days.

(21) Appl. No.: 15/229,180

(22) Filed: Aug. 5, 2016

(65) Prior Publication Data

US 2018/0038494 A1    Feb. 8, 2018

(51) Int. Cl.
  *F16K 15/03*  (2006.01)
  *F01N 13/08*  (2010.01)
  *B23P 15/00*  (2006.01)

(52) U.S. Cl.
  CPC .......... *F16K 15/033* (2013.01); *B23P 15/002* (2013.01); *F01N 13/08* (2013.01); *F01N 2240/36* (2013.01); *F01N 2390/08* (2013.01); *Y10T 137/7898* (2015.04)

(58) Field of Classification Search
  CPC .... F16K 15/033; F16K 15/03; F01N 2240/36; F01N 1/165; F01N 1/166; F01N 13/08; F01N 2390/08; Y10T 137/7898
  See application file for complete search history.

(56) References Cited

U.S. PATENT DOCUMENTS

| | | | |
|---|---|---|---|
| 3,234,924 A | 2/1966 | May | |
| 3,395,727 A * | 8/1968 | Weise | F16K 15/033 137/305 |
| 3,926,216 A * | 12/1975 | Rulcker | F16K 15/033 137/527.8 |
| 4,617,959 A * | 10/1986 | Yamada | F16K 15/033 137/484.2 |
| 4,699,244 A | 10/1987 | Bergquist et al. | |
| 4,860,790 A * | 8/1989 | Scaramucci | F16K 15/033 137/527 |
| 5,305,787 A * | 4/1994 | Thygesen | F16K 15/033 137/527 |
| 5,355,673 A | 10/1994 | Sterling et al. | |
| 5,584,315 A * | 12/1996 | Powell | E03F 7/04 137/15.18 |

(Continued)

FOREIGN PATENT DOCUMENTS

JP    2011208565 A * 10/2011

*Primary Examiner* — Reinaldo Sanchez-Medina
*Assistant Examiner* — David Colon Morales
(74) *Attorney, Agent, or Firm* — Harness, Dickey & Pierce, P.L.C.

(57) ABSTRACT

A snap-action valve assembly includes a valve flap positioned within a conduit for controlling exhaust flow through the conduit. A shaft supports the valve flap in the conduit for rotation about a pivot axis between a closed position and an open position. A guide is fixed to the valve flap. A torsion spring is positioned at least partially outside the conduit and includes a first end restricted from rotation in at least one direction. The torsion spring includes a second end coupled to the guide. The torsion spring is preloaded to urge the valve flap into contact with an inner surface of the conduit when the valve flap is in the closed position.

5 Claims, 3 Drawing Sheets

(56) References Cited

U.S. PATENT DOCUMENTS

| | | | | |
|---|---|---|---|---|
| 5,709,241 | A * | 1/1998 | Iwata | F01N 1/02 137/527 |
| 6,328,062 | B1 * | 12/2001 | Williams | E21B 34/06 137/527 |
| 6,581,721 | B2 * | 6/2003 | Nagai | F01N 1/165 137/527.4 |
| 6,648,013 | B1 * | 11/2003 | Ray | F16K 15/033 137/527 |
| 6,679,289 | B2 * | 1/2004 | Sisk | F16K 15/033 137/315.16 |
| 6,679,290 | B2 * | 1/2004 | Matthews | F16K 15/031 137/527 |
| 6,736,160 | B2 * | 5/2004 | Nagai | F01N 1/165 137/527 |
| 7,434,570 | B2 | 10/2008 | Hill | |
| 7,451,854 | B2 | 11/2008 | Suzuki et al. | |
| 7,798,235 | B2 * | 9/2010 | Mondelli | E21B 34/10 137/527 |
| 7,805,933 | B2 | 10/2010 | Hanitzsch et al. | |
| 7,896,130 | B2 * | 3/2011 | Hill | F01N 1/166 123/568.18 |
| 8,191,572 | B2 * | 6/2012 | Lefler | F02D 9/04 137/527 |
| 8,201,401 | B2 | 6/2012 | Abram et al. | |
| 8,657,065 | B1 * | 2/2014 | Hill | F01N 1/168 181/237 |
| 9,605,581 | B1 | 3/2017 | Middleton, Jr. et al. | |
| 9,624,837 | B2 | 4/2017 | Abram | |
| 9,651,160 | B2 * | 5/2017 | Barone | F16K 15/033 |
| 2008/0236680 | A1 | 10/2008 | Abram et al. | |
| 2008/0237521 | A1 | 10/2008 | Abram et al. | |
| 2009/0126356 | A1 | 5/2009 | Abram et al. | |
| 2010/0308517 | A1 * | 12/2010 | Goodson | C22C 19/05 267/154 |
| 2012/0175002 | A1 | 7/2012 | Trentadue | |
| 2013/0056083 | A1 | 3/2013 | Abram et al. | |
| 2013/0232961 | A1 | 9/2013 | Abram | |
| 2013/0233269 | A1 * | 9/2013 | Houtschilt | F01N 1/163 123/188.1 |
| 2015/0027566 | A1 * | 1/2015 | Kobori | F01N 1/08 137/527 |
| 2015/0152760 | A1 | 6/2015 | Kainuma et al. | |
| 2016/0222863 | A1 | 8/2016 | Middleton, Jr. et al. | |

* cited by examiner

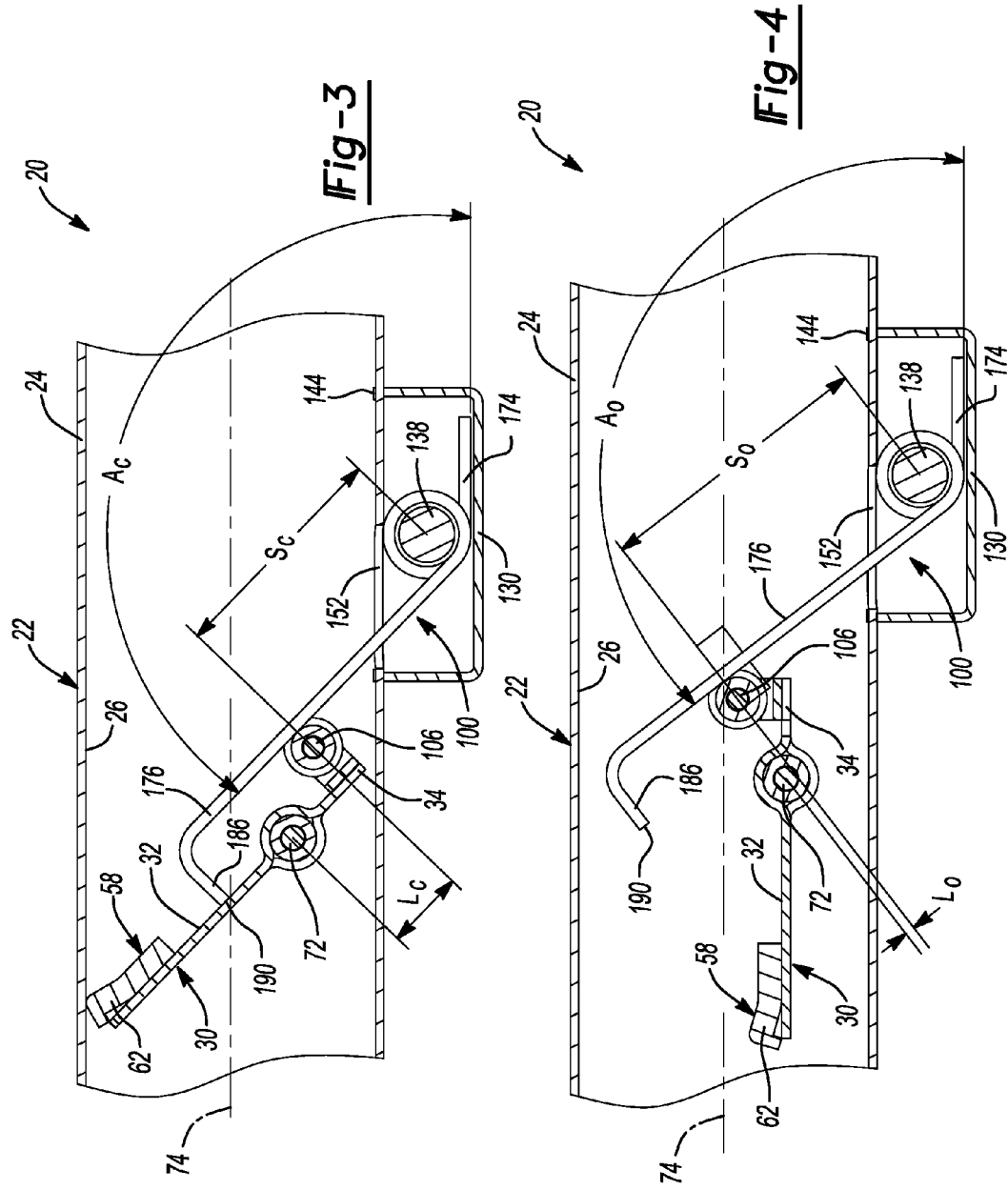

PASSIVE EXHAUST VALVE WITH DUAL TORSION SPRING

FIELD

The present disclosure relates to valve assemblies used in an exhaust system of a vehicle and to methods of manufacturing such valve assemblies.

BACKGROUND

This section provides background information related to the present disclosure which is not necessarily prior art.

Over the course of time, several vehicle exhaust systems have incorporated active and/or passive valve assemblies to alter the characteristics of the exhaust flow through a conduit as an exhaust pressure increases due to an increasing engine speed. Active valves typically carry an increased expense associated with an actuator, such as an electric solenoid. Passive valves utilize the pressure of the exhaust flow in the conduit to actuate the valve. Even though the passive valves are typically less expensive, traditional passive valves may create an undesirable increase in backpressure as the valve opens.

Both active and passive valves may be subject to difficulties in manufacturability that may be susceptible to vibration related noise and valve flutter caused by fluctuations in the exhaust flow rate exiting the engine. Additional complexities have arisen in the prior art in that several different variations of a certain passive valve are manufactured to account for different engine/vehicle specifications. Undesirable product proliferation may exist in order to account for the wide range of internal combustion engine displacements and exhaust conduit diameters used by vehicle manufacturers. Accordingly, a need in the art exists for a relatively inexpensive valve that may be easily manufactured from a small number of common subcomponents that meets the broad range of requirements from original equipment vehicle manufacturers.

SUMMARY

This section provides a general summary of the disclosure, and is not a comprehensive disclosure of its full scope or all of its features.

A snap-action valve assembly includes a valve flap positioned within a conduit for controlling exhaust flow through the conduit. A shaft supports the valve flap in the conduit for rotation about a pivot axis between a closed position and an open position. A guide is fixed to the valve flap. A torsion spring is positioned at least partially outside the conduit and includes a first end restricted from rotation in at least one direction. The torsion spring includes a second end coupled to the guide. The torsion spring is preloaded to urge the valve flap into contact with an inner surface of the conduit when the valve flap is in the closed position.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

FIG. 3 is a side view of the snap-action valve assembly showing the valve flap in the closed position; and FIG. 4 is a side view of the snap-action valve assembly showing the valve flap in the open position.

Corresponding reference numerals indicate corresponding parts throughout the several views of the drawings.

DETAILED DESCRIPTION

Figure 1:
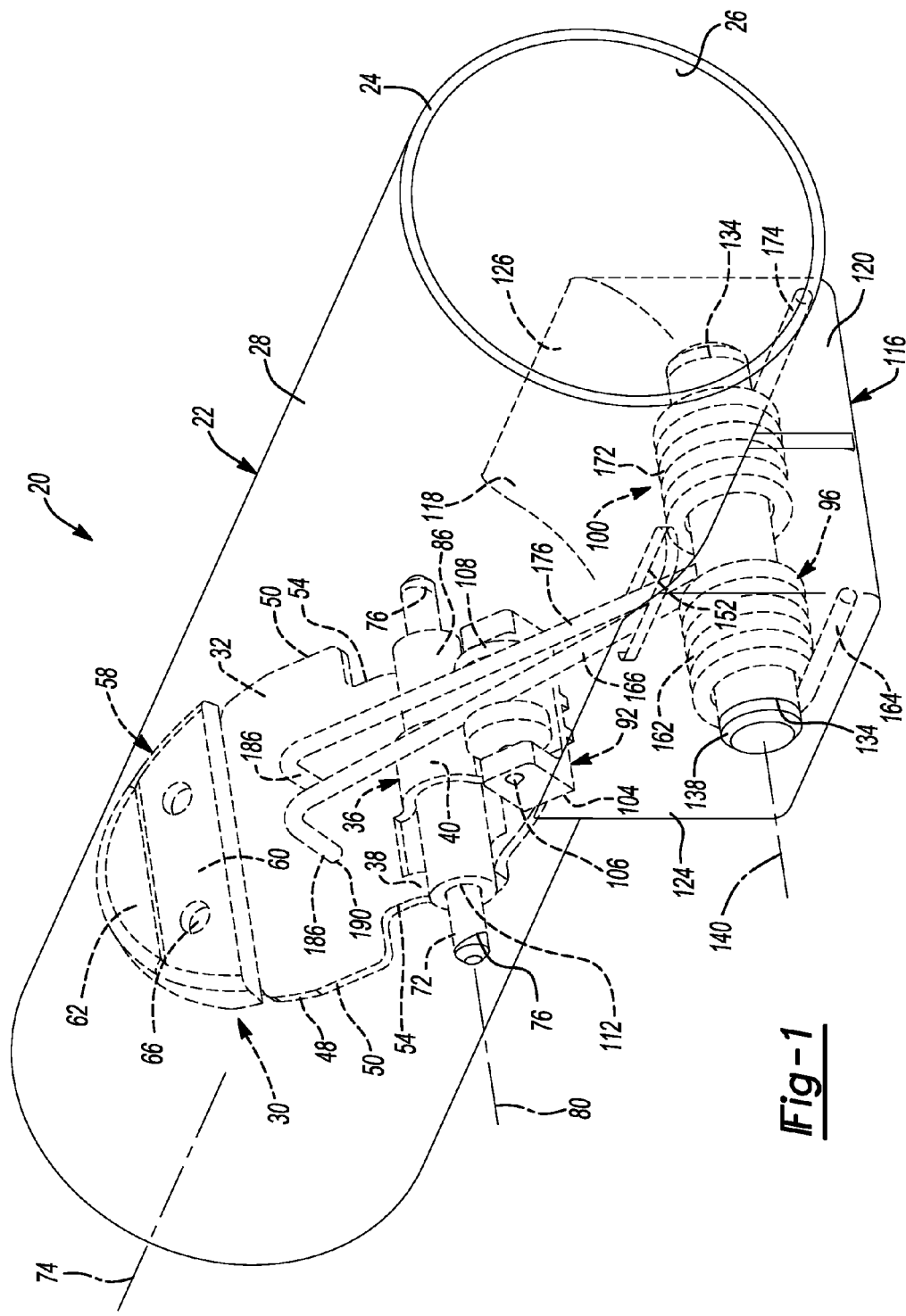
FIG. 1 is a perspective view of a snap-action valve assembly constructed in accordance with the teachings of the present disclosure.

Example embodiments will now be described more fully with reference to the accompanying drawings.

Referring to the Figures, wherein like numerals indicate corresponding parts throughout the several views, a snap-action valve assembly 20 for an exhaust system of a vehicle is disclosed.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms.

These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

Figure 2:
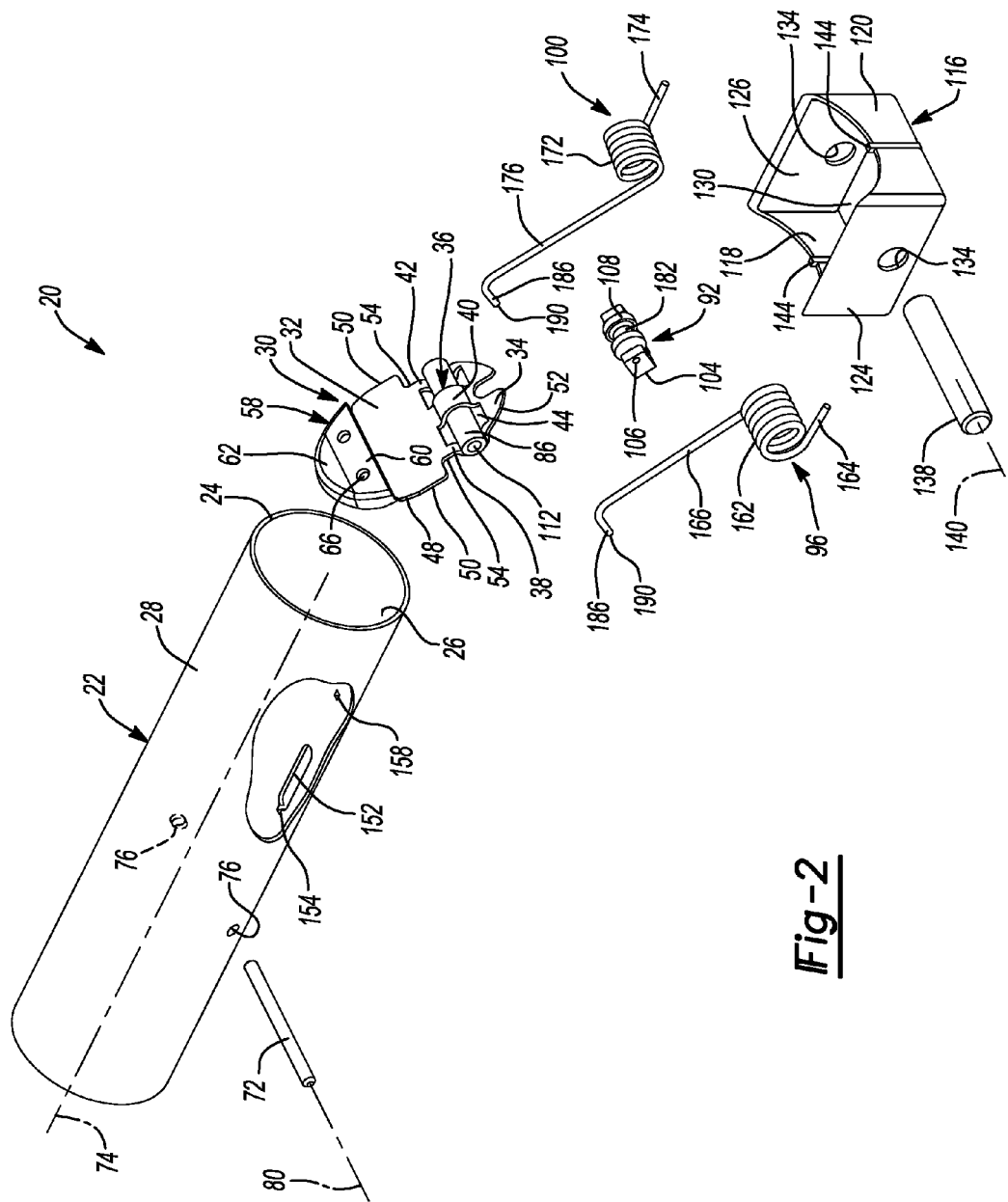
FIG. 2 is an exploded perspective view of the snap-action valve assembly.

With reference to FIGS. 1-4, snap-action valve assembly 20 includes a conduit 22 in the form of a tube having a circular cross-sectional shape. The conduit depicted in the Figures is merely exemplary and other conduits within the scope of the present disclosure may have a variety of different shapes and sizes and may be alternatively described as tubes or pipes. Conduit 22 includes a wall 24 having an inner surface 26 and an outer surface 28. Conduit 22 may be constructed from a variety of different materials. By way of non-limiting example, the conduit wall 24 may be made from SS409 or SS439 stainless steel. The wall may be first formed from a flat blank and subsequently rolled and welded along a longitudinal seam.

Snap-action valve assembly 20 includes a valve flap 30 positioned within conduit 22. Valve flap 30 is a substantially planar component including a first planar portion 32, a second planar portion 34, and a pocket portion 36 interconnecting first portion 32 and second portion 34. The pocket portion 36 includes a first strap 38, a second strap 40 and a third strap 42 laterally spaced apart from one another to define a pocket 44 that extends transversely across the valve flap 30 at a position that causes first planar portion 32 to be larger than second planar portion 34. First planar portion 32 includes a first arcuate edge 48 and a pair of linear side edges 50. Second planar portion 34 includes a second arcuate edge 52. Valve flap 30 also includes a pair of bushing cutouts 54 positioned near pocket portion 36. It should be appreciated that pocket portion 36 of valve flap 30 is offset from a line of symmetry of valve flap 30 such that first planar portion 32 has a greater surface area than second planar portion 34. Valve flap 30 may be made from a variety of different materials. By way of non-limiting example, valve flap 30 may be made from SS409 or SS439 stainless steel.

Snap-action valve assembly 20 includes a pad 58 that is fixed to valve flap 30. Pad 58 includes a body portion 60 that is attached to first planar portion 32 and an end portion 62 that extends over first arcuate edge 48 of first planar portion 32. Although pad 58 may be made from a variety of different materials and may be attached to the valve flap 30 in a number of different ways, in the illustrated example, pad 58 is constructed from a wire mesh material. Portions of the wire mesh material are deformed to define compressed dent regions 66 that have an increased density. The compressed dent regions 66 are spot welded to valve flap 30. By way of example without limitation, the wire mesh forming pad 58 may be made from SS316 stainless steel mesh that has a pre-compressed density ranging from 25-30%.

A shaft 72 supports valve flap 30 within conduit 22 for rotation between a closed position depicted in FIG. 3 and an open position depicted in FIG. 4. When valve flap 30 is in the closed position as shown in FIG. 3, end portion 62 of pad 58 contacts inner surface 26 of conduit 22. When valve flap 30 is in the open position as shown in FIG. 4, valve flap 30 is positioned such that the valve flap extends substantially parallel to a longitudinal axis 74 of conduit 22. When valve flap 30 is in the closed position, a majority of the exhaust flow through conduit 22 is obstructed. Some flow occurs between valve flap 30 and inner surface 26 when valve flap 30 is in the closed position. When valve flap 30 is in the open position, flow through conduit 22 is relatively unobstructed. It should be appreciated that the open position may be associated with other valve flap orientations where valve flap 30 is not parallel to longitudinal axis 74.

Shaft 72 passes through apertures 76 that extend through conduit wall 24. Shaft 72 defines a pivot axis 80 about which valve flap 30 rotates. Pivot axis 80 extends transverse to longitudinal axis 74 and is spaced apart from longitudinal axis 74. Stated another way shaft 72 is positioned off-center within conduit 22.

Snap-action valve assembly 20 includes a bushing 86 that supports shaft 72 for rotation relative to conduit 22. Bushing 86 is a substantially hollow cylindrical member that is positioned within pocket 44. Movement of bushing 86 is restricted by first strap 38, second strap 40, third strap 42 and wall 24 of conduit 22 when placed in the installed position depicted in FIGS. 3 and 4. Each of the first through third straps are shaped to generally complement the shape of bushing 86. The length of bushing 86 is set to closely match the spacing between portions of inner surface 26 of conduit 22 along axis 80. Bushing 86 may be constructed from a variety of different materials. In the illustrated example, bushing 86 is made of wire mesh. In the embodiment depicted in the Figures, the wire mesh of bushing 86 may be SS316 stainless steel mesh with a density of approximately 40%. The wire mesh may optionally be impregnated with mica or graphite.

A roller assembly 92 is fixed to valve flap 30 and functions to transfer load from a first helical spring 96 and a second helical spring 100 to valve flap 30. Roller assembly 92 includes a bracket 104, a pin 106, and a roller 108. Bracket 104 is fixed to second planar portion 34 of valve flap 30 via a process such as welding. Roller 108 is rotatably supported on pin 106. Pin 106 may be press fit to bracket 104 or otherwise fixed thereto. The position at which bracket 104 is fixed to valve flap 30 defines a moment arm "L" at which the force from springs 96, 100 applies a torque about axis 80. FIG. 3 depicts this distance as $L_c$ corresponding to the length of the lever arm when valve flap 30 is at the closed position. FIG. 4 illustrates this distance as $L_o$ as the length of the moment arm that exists when valve flap 30 is at the open position. It should be noted, the length of the moment arm "L" decreases as valve flap 30 rotates from the open position to the closed position.

Once the various components have been coupled to valve flap 30 as previously described, the valve flap subassembly is positioned within conduit 22 and shaft 72 is axially translated through apertures 76 and a bore 112 extending through bushing 86. At this time, shaft 72 may be fixed to conduit 22 by welding. Bushing 86 and valve flap 30 maintain their proper positions based on the geometrical features previously discussed.

A housing 116 includes first and second substantially planar side walls 118, 120 diametrically opposed from one another. Third and fourth substantially planar side walls 124, 126 are also spaced apart and diametrically opposed to one another. The third and fourth side walls interconnect the first and second side walls. An end plate 130 caps each of the first, second, third and fourth side walls 118, 120, 124, 126. Apertures 134 extend through third and fourth side walls 124, 126 and are in receipt of a retaining shaft 138. Retaining shaft 138 extends along an axis 140. First and second side walls 118, 120 have a curved shape to match the contour of outer surface 28 of conduit 22. Projections 144 extend from first and second side walls 118, 120.

Conduit 22 includes an elongated through slot 152 having a key way 154 at one end. An aperture 158 also extends through conduit 22. Aperture 158 is spaced apart from and generally axially aligned with slot 152. Key way 154 and aperture 158 are shaped to receive projections 144.

First spring 96 includes a helical body 162 wound in a left-handed direction, a first leg 164, and a second leg 166. Second spring 100 is substantially similar to first spring 96 except that it includes a helical body 172 wound in a right-hand direction. Second spring 100 includes a first leg 174 and a second leg 176. First spring 96 and second spring 100 are constructed from high temperature spring steel such as Inconel, Waspalloy, or the like. The wire diameter, coil diameter, number of turns and spring manufacturing techniques determine the output characteristics of the first and second springs 96, 100.

Snap-action valve assembly 20 is configured to bias end portion 62 of pad 58 into engagement with inner surface 26 of conduit 22 when no exhaust is flowing through the conduit. Based on a number of factors including vehicle engine cylinder displacement, exhaust conduit diameter and the number of exhaust conduits associated with the internal combustion engine, a predetermined exhaust pressure at which valve flap 30 beings to move from the closed position toward the open position is determined. Empirical test data or theoretical calculations may be utilized to assure that the snap-action valve assembly reduces low frequency noise at low exhaust flow rates and minimizes pressure drop across the valve assembly at high exhaust flow rates.

Once the pressure to initially move valve flap 30 from the closed position toward the open position is determined, the forces required as inputs from first spring 96 and second spring 100 may be calculated based on the geometry of snap-action valve assembly 20. Factors influencing the required spring forces include the surface area of first planar portion 32 upon which the exhaust gas acts on valve flap 30 to urge rotation in an opening direction, the location of axis 80 relative to longitudinal axis 74, the surface area of second planar portion 34 upon which the exhaust gas acts to urge rotation of valve flap 30 in a closing direction, the position of roller 108, and the portions of second legs 166, 176 that form moment arms identified with a capital "S" in FIGS. 3 and 4. FIG. 3 depicts the length of the spring moment arm with the valve flap 30 in the closed position as $S_c$. FIG. 4 depicts the length of the spring moment arm as $S_o$ when valve flap 30 is in the open position. It should be noted that the moment arm length increases as valve flap 30 moves from the open position to the closed position.

FIG. 3 depicts spring 96, 100 in a preloaded condition defining an angle $A_c$ between first legs 164, 174 and second legs 166, 176. The preload condition of FIG. 3 relates to an angle $A_c$ being less than the angle defined between the first and second legs of the springs when the springs are in a free, unloaded condition. Angle $A_o$ is the resultant angle when valve flap 30 is at the open position. Angle $A_o$ is less than angle $A_c$. Accordingly, the output torque of first and second springs 96, 100 at the position in depicted in FIG. 4 is greater than the output torque at the position depicted in FIG. 3. By design, the increase in output torque substantially offsets the increased length of moment arm $S_o$ as compared to $S_c$.

To apply the preload to valve flap 30, second spring legs 166, 176 are placed in engagement with roller 108. Roller 108 includes a central groove 182 in receipt of the second legs of each spring 96, 100 to maintain the springs at a desired position. Second spring legs 166, 176 extend through slot 152 while helical coils 162, 172 remain positioned outside of outer surface 28 of conduit 22. Retaining shaft 138 extends through apertures 134 of housing 116 and through each helical coil 162, 172. First legs 164, 174 are placed into engagement with end plate 130. A force is applied to housing 116 to preload each of first and second springs 96, 100 as housing 116 is placed into engagement with outer surface 28 of conduit 22. Projections 144 are disposed within key way 154 and aperture 158 to properly position housing 116 relative to conduit 22. Housing 116 is welded to conduit 22 to create a seal between housing 116 and outer surface 28 of conduit 22. In this manner, first and second springs 96, 100 are protected from exposure to the environment. At this time, first spring legs 164, 174 are oriented relative to second spring legs 166, 176 as shown in FIG. 3 and the springs are in a preloaded condition biasing valve flap 30 into contact with inner surface 26 of conduit 22.

In operation, snap-action valve assembly 20 provides desirable reduction of low frequency noise at low exhaust flow rates as some exhaust is allowed to flow around valve flap 30 and through conduit 22 while valve flap 30 is in the closed position. Once a predetermined pressure acts on valve flap 30 sufficient to overcome the torque applied by first and second springs 96, valve flap 30 moves from the closed position toward the open position. It should be appreciated that due to the geometrical features previously discussed, a pressure required to maintain valve flap 30 in a position other than the closed position decreases as the flow rate of exhaust through conduit 22 increases. By way of the aforementioned construction, the snap-action valve assembly 20 provides both functions of reducing low frequency noise at low flow rates when the valve flap is in a closed position and minimizing pressure drop across the valve at increased exhaust flow rates.

Each of first and second springs 96, 100 includes a stop 186 integrally formed with second legs 166, 176. Stops 186 extend at substantially 90 degrees to the portions of second legs 166, 176 that are positioned in contact with roller 108. Each stop 186 includes an end face 190 that is positioned to contact first planar portion 32 when valve flap 30 is moving from the open position toward the closed position. Valve flap 30 contacts end faces 190 prior to end portion 62 of pad 58 contacting inner surface 26 of conduit 22. By arranging the stops 186 at this position, first and second springs 96, 100 reduce the severity of impact between valve flap 30 and conduit 22 during conditions where an exhaust flow rate rapidly decreases and the valve flap 30 rapidly moves toward the closed position. The stops may also be useful for rattle prevention purposes. It should be appreciated that stops 186 are optional and that first and second springs 96, 100 may be constructed without these features without departing from the scope of the present invention.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A method of assembling a snap-action valve assembly, the method comprising:
   fixing a valve flap to a shaft and supporting the valve flap in a conduit for rotation about a pivot axis between a closed position and an open position;
   supporting a roller for rotation on the valve flap;
   coupling a first end of a torsion spring to a housing and a second end of the torsion spring to the roller;
   moving the housing into contact with the conduit to apply a spring preload such that the valve flap is urged into contact with an inner surface of the conduit when the valve flap is in the closed position; and
   fixing the housing to the conduit to maintain the spring preload.

2. The method of assembling a snap-action valve assembly of claim 1, further including extending a portion of the spring through an aperture extending through a wall of the conduit.

3. The method of assembling a snap-action valve assembly of claim 1, further including sealingly fixing the housing to the conduit to restrict contaminant ingress.

4. The method of assembling a snap-action valve assembly of claim 1, further including forming spaced apart straps on the valve flap, translating a bushing between the straps, and positioning the shaft within the bushing.

5. The method of assembling a snap-action valve assembly of claim 1, further including positioning an end of the spring at a location to contact the valve flap as the valve flap moves from the open position toward the closed position.

* * * * *